(12) United States Patent
Lee et al.

(10) Patent No.: US 11,899,231 B2
(45) Date of Patent: Feb. 13, 2024

(54) DISPLAY DEVICE INCLUDING POLARIZING PLATE, WINDOW MEMBER AND ELECTRONIC MODULE

(71) Applicant: Samsung Display Co., Ltd., Yongin-Si (KR)

(72) Inventors: Jung-Hun Lee, Hwaseong-si (KR); Sungun Park, Suwon-si (KR); Sanghyeok Kim, Cheonan-si (KR); Jungsun Kim, Cheonan-si (KR); Jihwa Lee, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 261 days.

(21) Appl. No.: 17/095,055

(22) Filed: Nov. 11, 2020

(65) Prior Publication Data

US 2021/0311238 A1 Oct. 7, 2021

(30) Foreign Application Priority Data

Apr. 2, 2020 (KR) .................. 10-2020-0040557

(51) Int. Cl.
*G02B 5/30* (2006.01)
*G02B 1/14* (2015.01)
*G02F 1/13363* (2006.01)
*G02F 1/1335* (2006.01)
(Continued)

(52) U.S. Cl.
CPC .............. *G02B 5/3016* (2013.01); *G02B 1/14* (2015.01); *G02F 1/133331* (2021.01); *G02F 1/133531* (2021.01); *G02F 1/133631* (2021.01); *G02F 1/133633* (2021.01); *G02F 1/133638* (2021.01); *G02F 2201/503* (2013.01); *G02F 2202/28* (2013.01); *G06F 1/1686* (2013.01)

(58) Field of Classification Search
CPC ......... G02F 1/133331; G02F 1/133528; G02F 1/133531; G02F 2201/503; G02B 1/14; G06F 1/1686
See application file for complete search history.

(56) References Cited

U.S. PATENT DOCUMENTS 9,224,973 B2 12/2015 Park et al.
10,101,512 B2 10/2018 Shin et al.
(Continued)

FOREIGN PATENT DOCUMENTS

KR 100987283 B1 10/2010
KR 101730856 B1 4/2017
(Continued)

*Primary Examiner* — Paisley L Wilson
(74) *Attorney, Agent, or Firm* — CANTOR COLBURN LLP

(57) ABSTRACT

A display device includes a display panel, a polarizing plate disposed above the display panel, where the polarizing plate includes a linear polarizing layer and a retardation layer, a window member disposed above the polarizing plate, where the window includes a window and a protective layer disposed above the window, the protective layer has a retardation of about 100 nm or less or about 5000 nm or greater, an optical member disposed below the display panel, a support member disposed below the optical member, where a through-hole is defined through the support member, and an electronic module disposed to correspond to the through-hole.

20 Claims, 11 Drawing Sheets

(51) Int. Cl.
*G02F 1/1333* (2006.01)
*G06F 1/16* (2006.01)

(56) References Cited

U.S. PATENT DOCUMENTS

| | | | |
|---|---|---|---|
| 2007/0200976 A1* | 8/2007 | Kawamoto | G02B 5/3016 |
| | | | 349/96 |
| 2013/0093982 A1* | 4/2013 | Kuroda | G02B 1/10 |
| | | | 349/61 |
| 2014/0159001 A1* | 6/2014 | Park | H01L 51/52 |
| | | | 257/40 |
| 2018/0017714 A1 | 1/2018 | Nomoto et al. | |
| 2018/0356564 A1 | 12/2018 | Jeong et al. | |
| 2020/0292871 A1* | 9/2020 | Inoue | G02F 1/133528 |
| 2021/0011337 A1* | 1/2021 | Ueki | G02B 1/14 |

FOREIGN PATENT DOCUMENTS

| | | |
|---|---|---|
| KR | 1020170054457 A | 5/2017 |
| KR | 101758432 B1 | 7/2017 |
| KR | 1020180066243 A | 6/2018 |
| KR | 102028053 B1 | 10/2019 |

* cited by examiner

DISPLAY DEVICE INCLUDING POLARIZING PLATE, WINDOW MEMBER AND ELECTRONIC MODULE

This application claims priority to Korean Patent Application No. 10-2020-0040557, filed on Apr. 2, 2020, and all the benefits accruing therefrom under 35 U.S.C. § 119, the content of which in its entirety is herein incorporated by reference.

BACKGROUND

1. Field

The disclosure herein relates to a display device, and more particularly, to a display device including a camera module.

2. Description of the Related Art

Various types of display device have been widely used in various fields to provide image information, and such a display device may include electronic modules for receiving external signals or providing output signals to the outside. For example, the electronic modules may include camera modules or the like. The demand for a display device capable of obtaining high-quality captured images is increasing.

SUMMARY

In a display device, a camera module or the like may be arranged in the image displaying area to increase an image displaying area in the display device. Accordingly, the quality of a captured image by the camera module may be desired to be improved.

The disclosure provides a display device with improved quality of an image which is captured by a camera module in a display surface direction of the display device.

The disclosure also provides a display device in which, when an image is captured in a selfie mode, image quality is effectively prevented from being degraded due to functional layers included in the display device.

An embodiment of the invention provides a display device including: a display panel; a polarizing plate disposed above the display panel, where the polarizing plate includes a linear polarizing layer a retardation layer; a window member disposed above the polarizing plate, where the window member includes a window and a protective layer disposed above the window, and the protective layer has a retardation of about 100 nanometers (nm) or less or about 5000 nm or greater; an optical member disposed below the display panel; a support member disposed below the optical member, where a through-hole is defined through the support member; and an electronic module disposed to correspond to the through-hole.

In an embodiment, the protective layer may include an unstretched cyclo-olefin polymer film, an unstretched polyether sulfone film, and a stretched polyethylene terephthalate film which has a retardation of about 5000 nm or greater.

In an embodiment, an angle between a transmitting axis of the linear polarizing layer and an optical axis of the protective layer may be about 45±5°.

In an embodiment, the polarizing plate may further include a base film disposed above the linear polarizing layer, where the base film may have an elongation rate in a first direction which is greater than an elongation rate in a second direction perpendicular to the first direction, and the retardation layer may be disposed below the linear polarizing layer or above the base film.

In an embodiment, the retardation layer may include a $\lambda/2$ retardation layer and a $\lambda/4$ retardation layer, and the $\lambda/2$ retardation layer may be disposed closer to the linear polarizing layer than the $\lambda/4$ retardation layer.

In an embodiment, an angle between a transmitting axis of the linear polarizing layer and an optical axis of the $\lambda/2$ retardation layer may be about 15±5°, and an angle between the transmitting axis of the linear polarizing layer and an optical axis of the $\lambda/4$ retardation layer may be about 75±5°.

In an embodiment, each of the $\lambda/2$ retardation layer and the $\lambda/4$ retardation layer may be a liquid crystal coating layer.

In an embodiment, the base film may be a stretched acrylic film, a stretched cyclo-olefin polymer film, or a stretched polyethylene terephthalate film.

In an embodiment, an angle between a transmitting axis of the linear polarizing layer and an optical axis of the base film may be about 45±5°.

In an embodiment, the optical member may include a polymer film having a retardation of about 600 nm or less or about 5000 nm or greater.

In an embodiment, the polymer film may be a polyethylene terephthalate film.

In an embodiment, the display device may further include an impact absorbing layer disposed between the polarizing plate and the window member.

In an embodiment, the impact absorbing layer may have a retardation of about 100 nm or less.

In an embodiment, the impact absorbing layer may include an unstretched cyclo-olefin polymer film or an unstretched polyether sulfone film.

In an embodiment, the display device may further include an adhesive layer disposed between the window member and the polarizing plate, between the polarizing plate and the display panel, or between the display panel and the optical member.

In an embodiment, at least a portion of the electronic module may be inserted into the through-hole.

In an embodiment of the invention, a display device includes: a display panel; a polarizing member disposed above the display panel, where the polarizing member includes a linear polarizing layer; a window member disposed above the polarizing member, where the window member includes a protective layer having a first optical axis and a retardation of about 100 nm or less or about 5000 nm or greater, and an angle between the first optical axis and a transmitting axis of the linear polarizing layer is about 45±5°; an optical member disposed below the display panel, where the optical member includes a polymer film having a retardation of about 600 nm or less or about 5000 nm or greater; a support member disposed below the optical member, where a through-hole is defined through the support member; and an electronic module disposed to correspond to the through-hole.

In an embodiment, the display device may further include an impact absorbing layer disposed between the polarizing member and the window member, where the impact absorbing layer has a retardation of about 100 nm or less.

In an embodiment, the protective layer may include an unstretched cyclo-olefin polymer film, an unstretched polyether sulfone film, or a stretched polyethylene terephthalate film which has a retardation of about 5000 nm or greater.

In an embodiment, the display panel may include an active area and a peripheral area adjacent to the active area, and the through-hole may overlap the active area and be spaced apart from the peripheral area in a plan view.

BRIEF DESCRIPTION OF THE DRAWING

The above and other features of the invention will become more apparent by describing in further detail embodiments thereof with reference to the accompanying drawings, in which.

Figure 9:
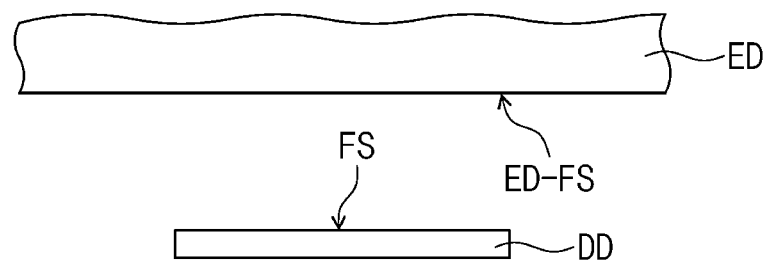
FIG. 9 is a view schematically showing an embodiment of a display device in an environment of use.
Figure 9:
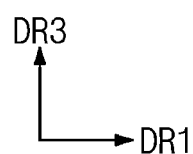
Figure 10A:
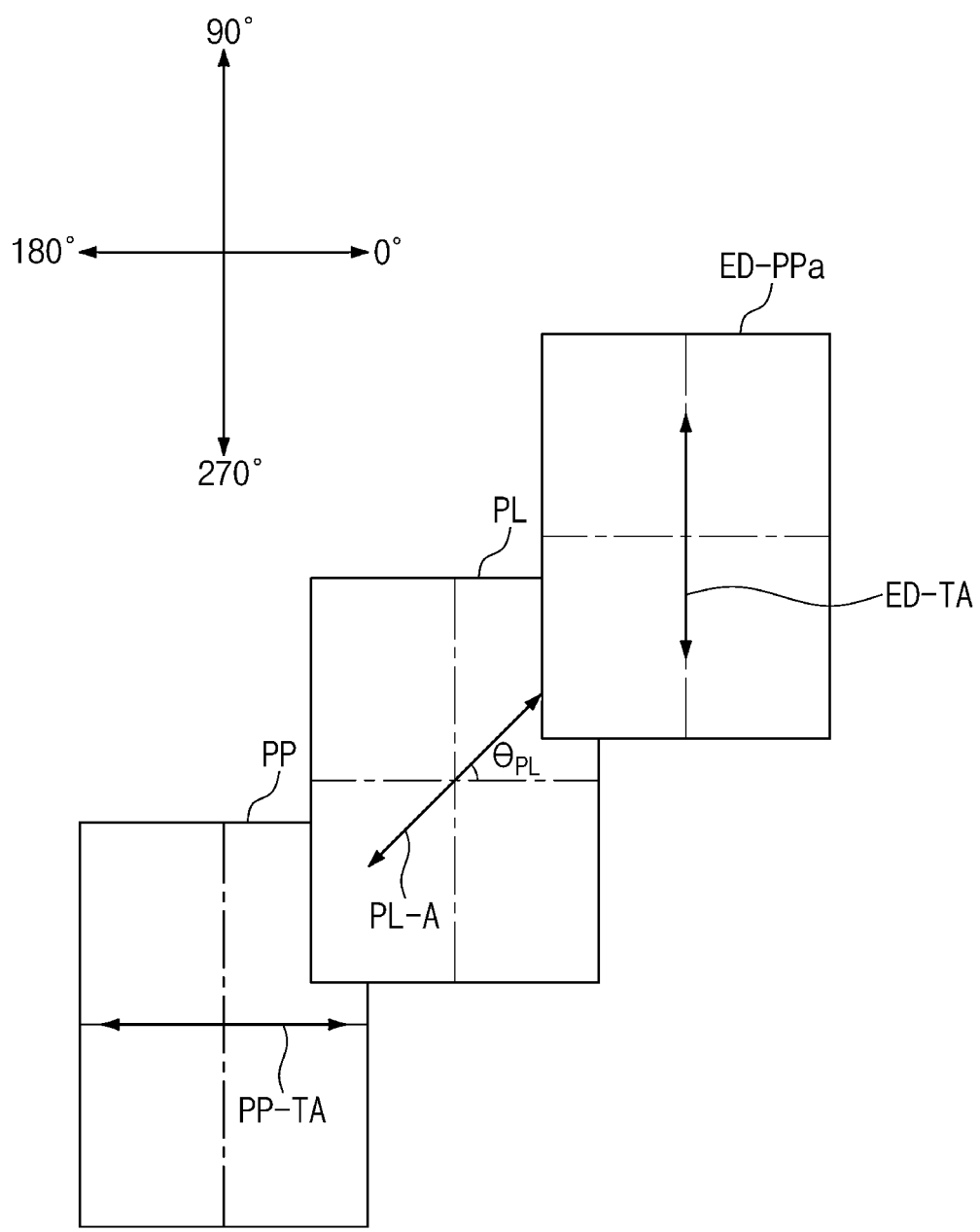
Figure 10B:
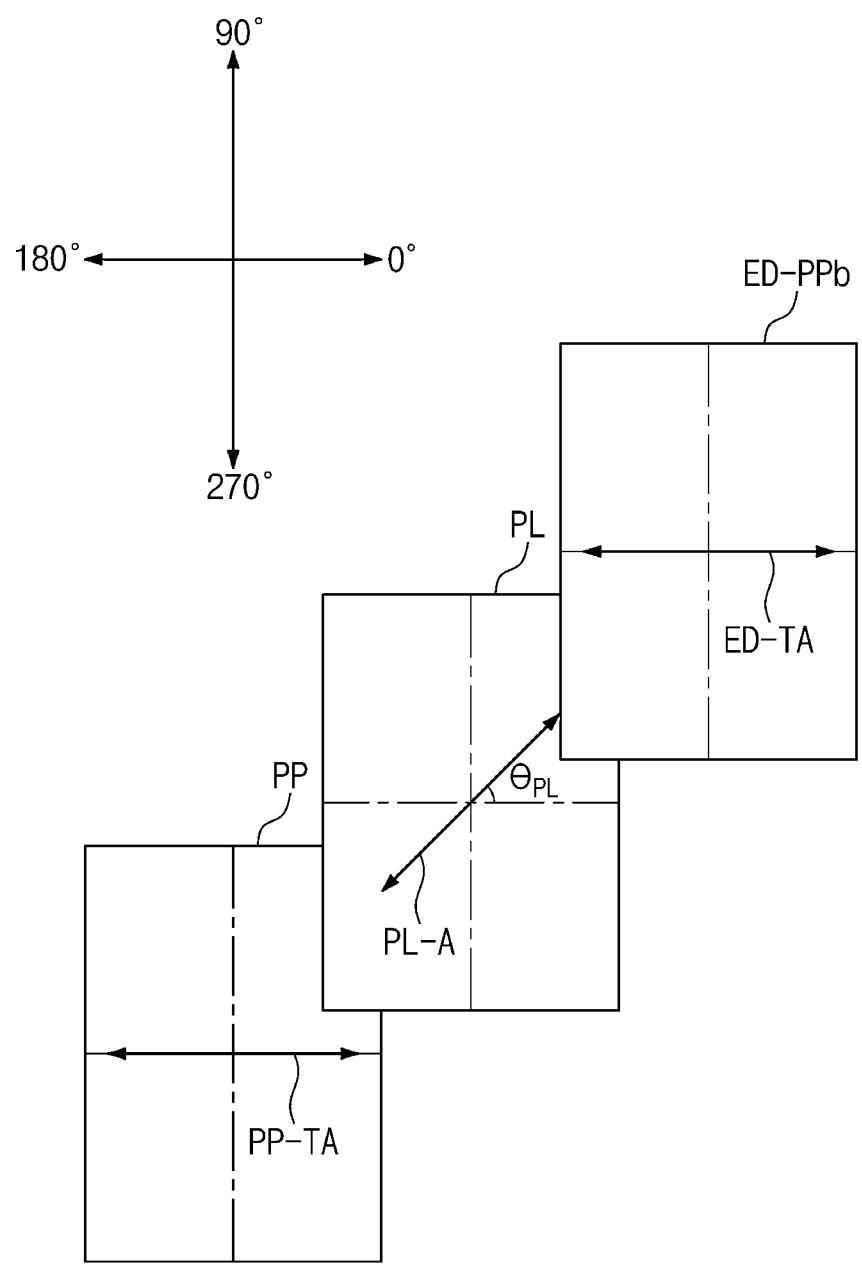
Figure 11A:
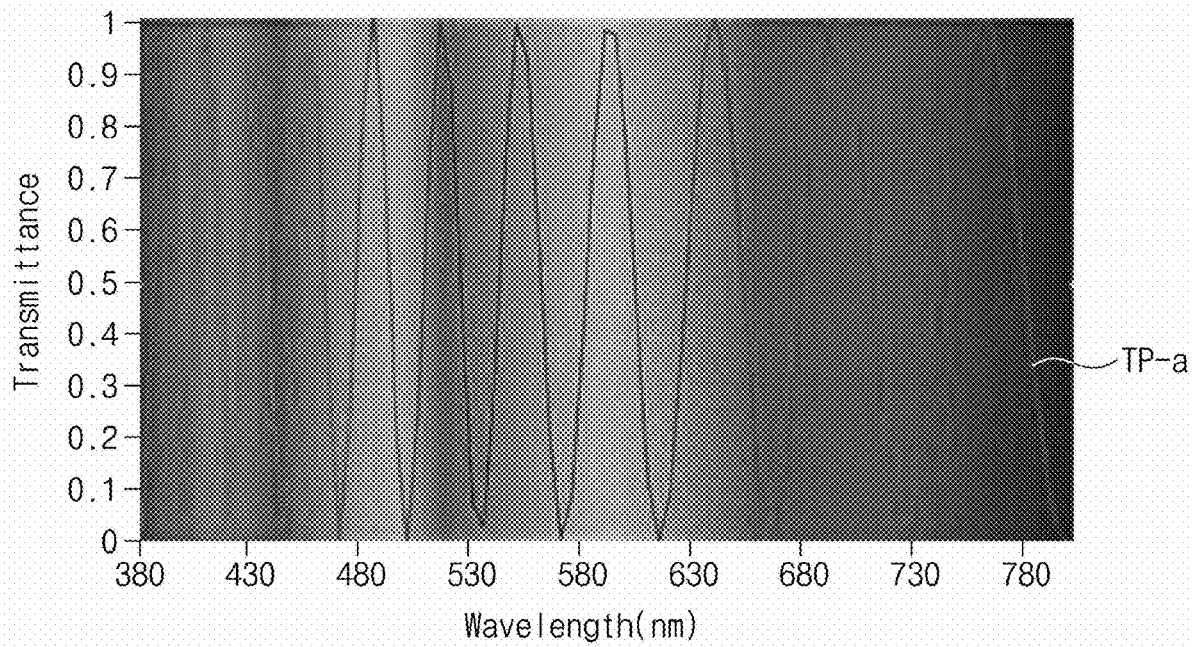
Figure 11B:
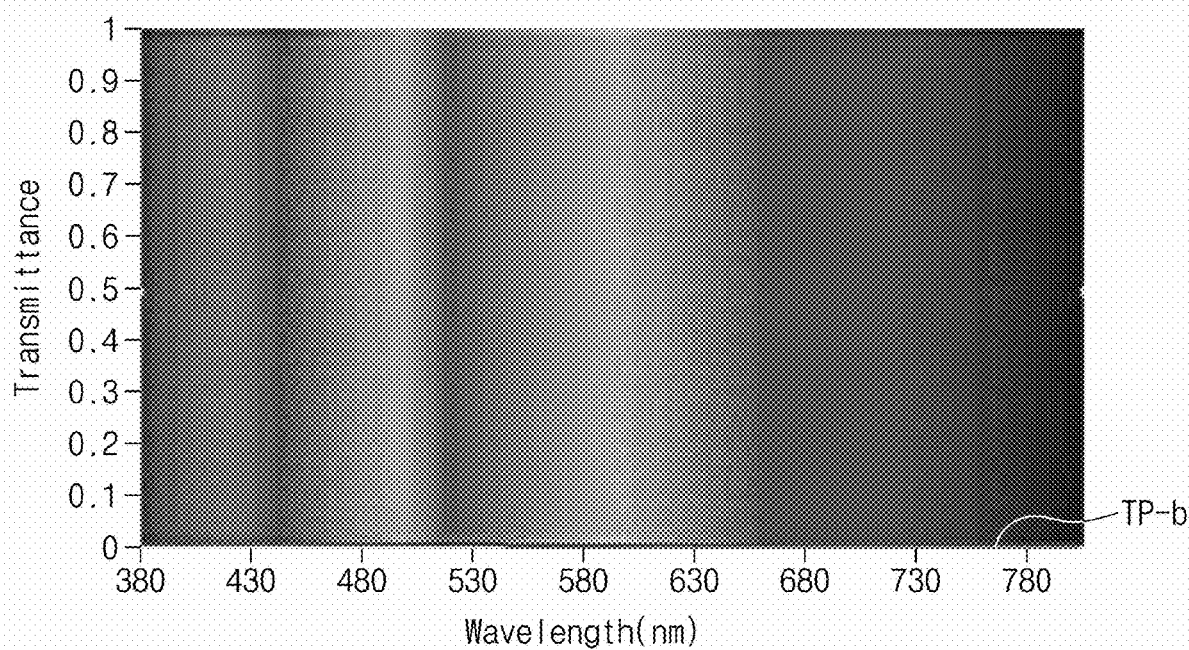

Each of FIGS. 10A and 10B is a view showing relationships between optical axes in a case where a display device according to an embodiment is used in the environment illustrated in FIG. 9; and Each of FIGS. 11A and 11B is an image showing a simulation result that reproduces a case in which a display device according to an embodiment is used in the environment illustrated in FIG. 9.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element (or a region, a layer, a portion, or the like) is referred to as "being on", "connected to" or "coupled to" another element, it can be directly disposed on, connected or coupled to the other element, or intervening elements may be disposed therebetween.

However, in this application, being "disposed directly on" may mean that there is no additional layer, film, region, plate, or the like between a part and another part such as a layer, a film, a region, a plate, or the like. For example, being "disposed directly on" may mean that two layers or two members are disposed without using an additional member such as an adhesive member therebetween.

Like numbers refer to like elements throughout. Also, in the drawings, the thickness, the ratio, and the dimension of elements are exaggerated for effective description of the technical contents.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms first, second, etc. may be used herein to describe various elements, these elements should not be limited by these terms. These terms are only used to distinguish one element from another element. For example, a first element may be referred to as a second element, and similarly, a second element may be referred to as a first element without departing from the teachings of the disclosure. The singular forms are intended to include the plural forms as well, unless the context clearly indicates otherwise.

Also, terms of "below", "lower", "above", "upper" may be used to describe the relationships of the components illustrated in the drawings. These terms have a relative concept, and are described on the basis of the directions indicated in the drawings. In the specification, being "disposed on" may represent not only being disposed on the top surface but also being disposed on the bottom surface.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which the disclosure belongs. Also, terms as defined in a commonly used dictionary should be construed as having the same meaning as in an associated technical context, and cannot be construed in ideal or excessively formal meaning, unless being defined so apparently herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of a display device according to the invention will be described in detail with reference to the accompanying drawings.

Figure 1:
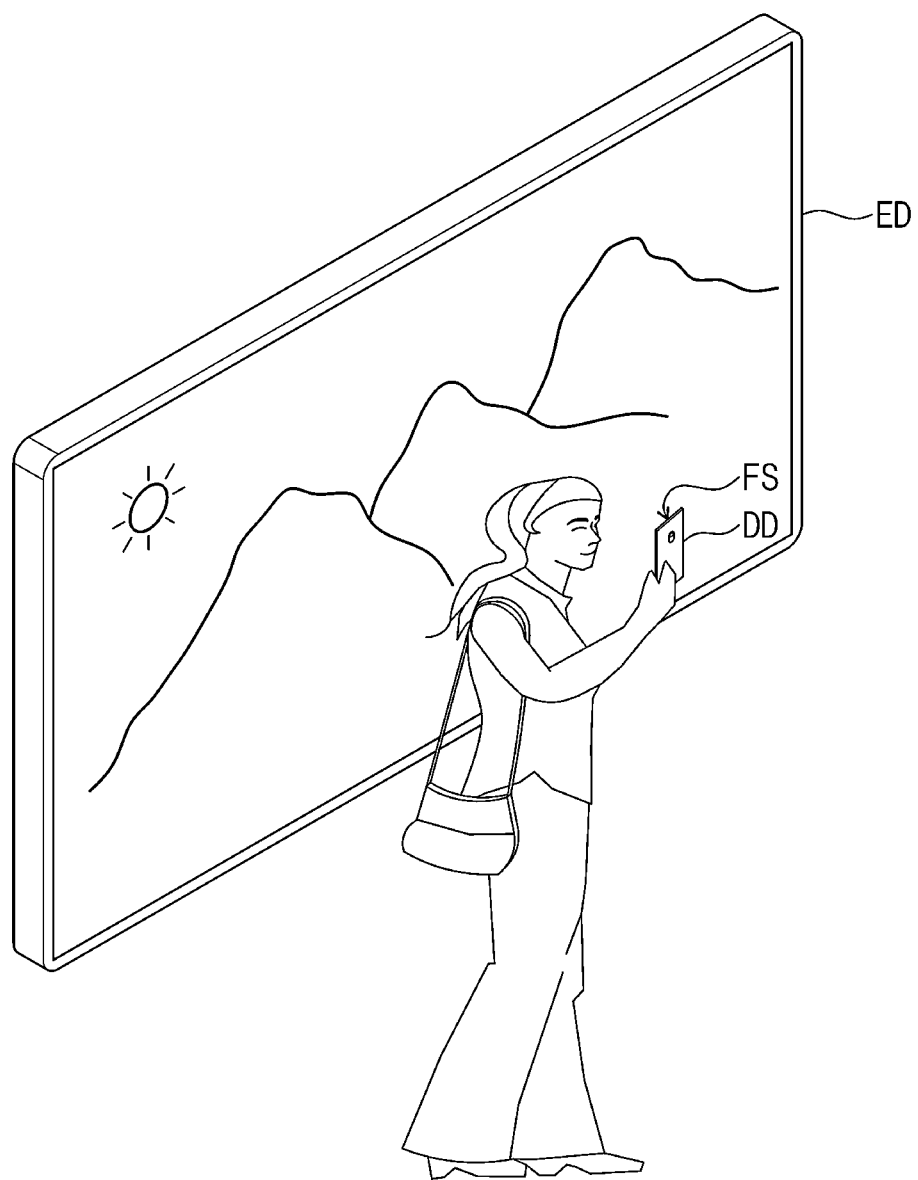
FIG. 1 is a view illustratively showing an embodiment of a display device and a usage thereof.
Figure 2:
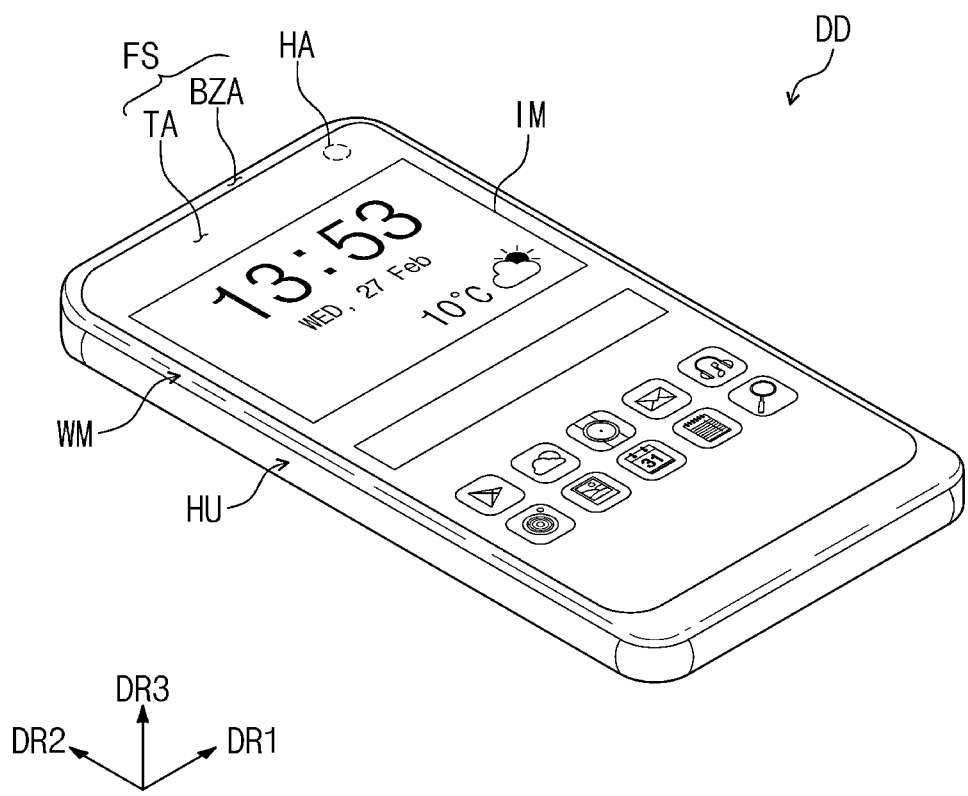
FIG. 2 is a perspective view of a display device according to an embodiment.
Figure 3:
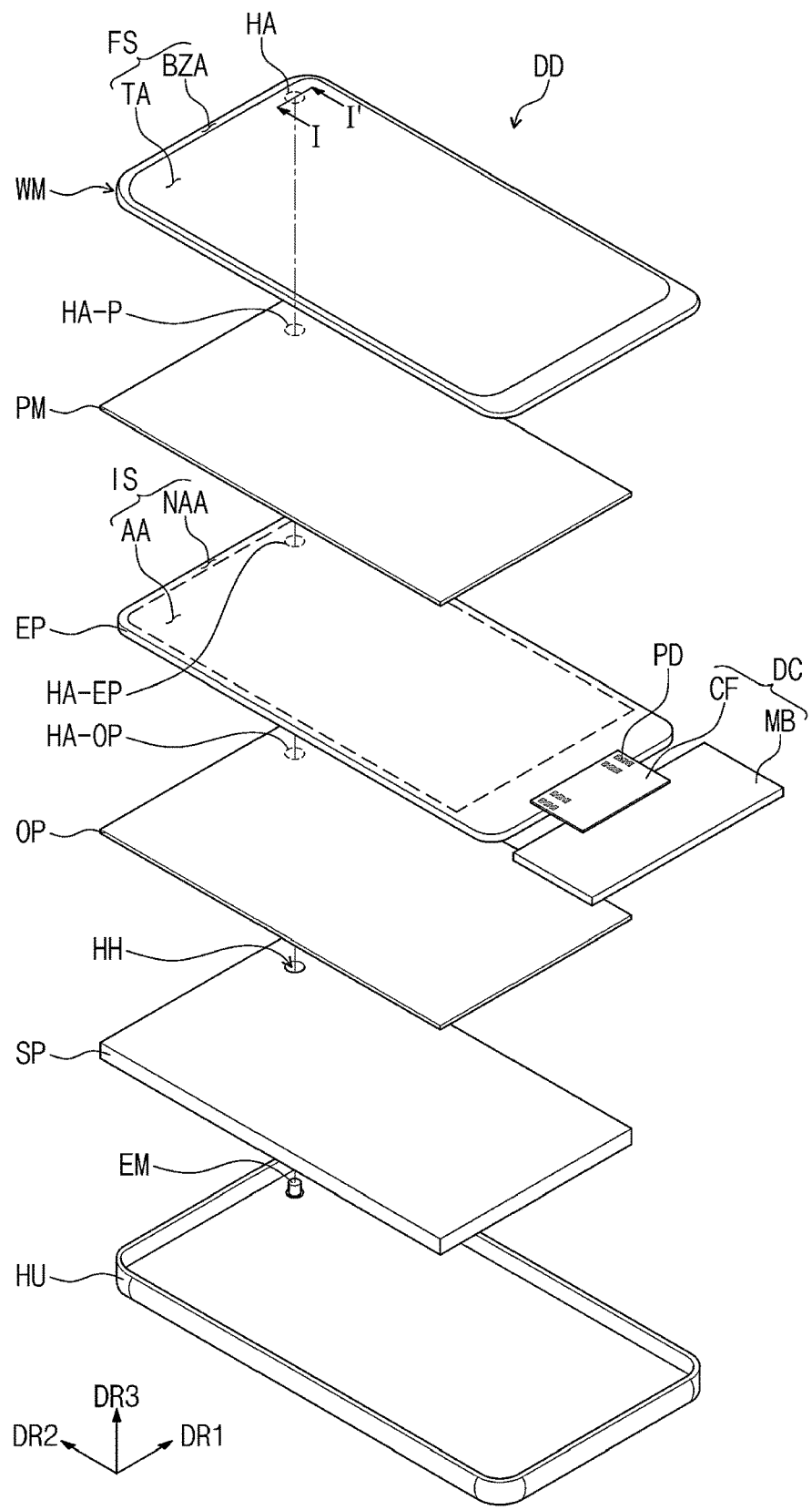
FIG. 3 is an exploded perspective view of a display device according to an embodiment.
Figure 4:
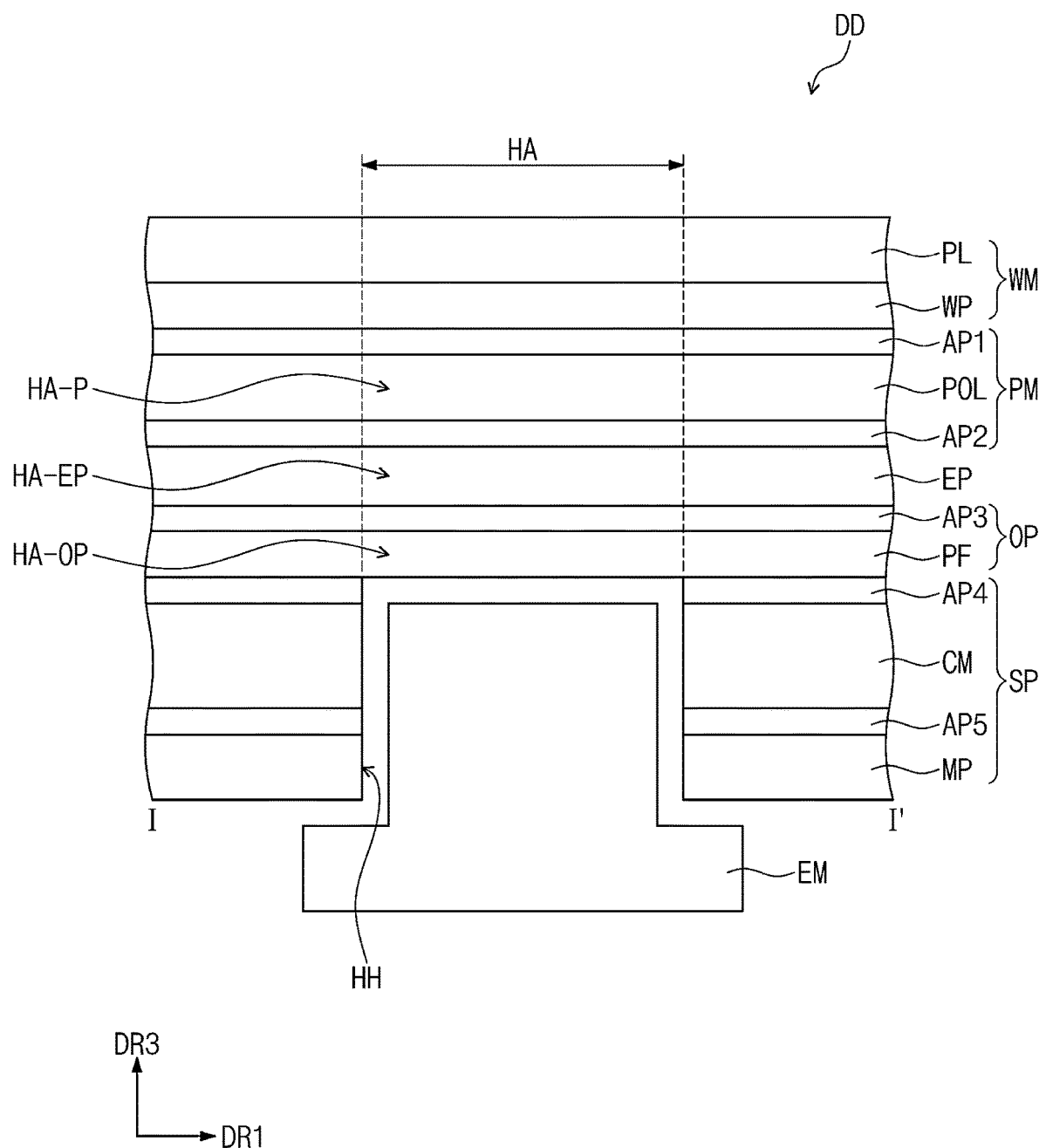
FIG. 4 is a cross-sectional view of a portion of a display device according to an embodiment.

FIG. 1 is a view showing an embodiment of a display device and a usage thereof, FIG. 2 is a perspective view of a display device according to an embodiment, and FIG. 3 is an exploded perspective view of a display device according to an embodiment. FIG. 4 is a cross-sectional view of a display device according to an embodiment. FIG. 4 is a cross-sectional view taken along line I-f of FIG. 3 and showing a portion of a display device.

FIG. 1 illustratively shows an embodiment of a display device DD according to the invention. More particularly, FIG. 1 shows a use example in which the display device DD is used to capture an image in a selfie mode. FIG. 1 shows a use example in which a user uses the display device DD to capture an image in front of an electronic apparatus ED. In this use example, the image is captured while an upper surface FS of the display device DD faces the electronic apparatus ED.

In FIG. 1, an embodiment of the electronic apparatus ED may be a large electronic apparatus such as a television, a monitor, or an outdoor advertisement board. In an embodiment, the display device DD may be a small-to-medium electronic apparatus such as a smart phone, a personal computer, a laptop computer, a personal digital terminal, a vehicle navigation unit, or a game console. However, the embodiments of the electronic apparatus ED and the display device DD listed above are merely exemplary, and not being limited thereto. Accordingly, other electronic apparatuses may be employed as long as not departing from the teachings of the invention. In one alternative embodiment, for example, the electronic apparatus ED may be a small-to-medium electronic apparatus such as a smart phone, a personal computer, a laptop computer, a personal digital terminal, a vehicle navigation unit, or a game console.

In an embodiment, as illustrated in FIG. 1, when the image is captured in the selfie mode, the quality of the captured image may be degraded due to an optical interference effect between functional layers (a protective layer, a polarizing plate, an optical member, and the like) disposed in front of an electronic module EM and included in the display device DD and optical functional layers (a polarizing plate and the like) included in the electronic apparatus ED. In one embodiment, for example, an image quality degradation phenomenon such as rainbow mura may occur due to an optical interference effect between the functional layers included in the display device DD and the optical functional layers included in the electronic apparatus ED.

In an embodiment, as shown in FIG. 2, the display device DD includes a transmission area TA and a bezel area BZA. An image IM may be displayed through the transmission area TA of the display device DD. In an embodiment, as shown in FIG. 2, the image IM may be a watch and a plurality of icons, for example. In an embodiment, the transmission area TA and the bezel area BZA of the display device DD illustrated in FIG. 2 may correspond to a transmission area TA and a bezel area BZA of a window member WM.

In an embodiment, the display device DD may display the image IM in a direction of a third directional axis DR3 on a display surface parallel to a plane defined by a first directional axis DR1 and a second directional axis DR2. The display surface, on which the image IM is displayed, may correspond to an upper surface FS of the display device DD and may also correspond to an upper surface FS of the window member WM. In an embodiment, the display device DD may have a three-dimensional shape having a predetermined thickness in the direction of the third directional axis DR3 which is a direction perpendicular to the plane defined by the first directional axis DR1 and the second directional axis DR2.

In an embodiment, the transmission area TA may have a quadrangular shape parallel to the plane defined by the first directional axis DR1 and the second directional axis DR2. However, this is merely exemplary. Alternatively, the transmission area TA may have one of other various shapes and is not limited to one embodiment.

The bezel area BZA is adjacent to the transmission area TA. In an embodiment, as shown in FIG. 2, the bezel area BZA may surround the transmission area TA. However, this is merely exemplary. Alternatively, the bezel area BZA may be disposed adjacent to only a single side of the transmission area TA. Alternatively, the bezel area BZA may be omitted.

In an embodiment, a hole area HA may be defined in the display device DD. The hole area HA may be an area overlapping the electronic module EM. In such an embodiment, the hole area HA may be an area in which a camera module or the like for capturing an image of an external object is disposed or may be an area in which an optical sensor for sensing light is disposed. In an embodiment of the display device DD, the electronic module EM may be a camera module. In one embodiment, for example, the electronic module EM of the display device DD may be a camera module in which a lens is disposed toward the upper surface FS to capture an image in the selfie mode. The image IM provided from the display device DD may be displayed while surrounding at least a portion of an edge of the hole area HA.

Herein, an upper surface (or a front surface) and a lower surface (or a rear surface) for each member are defined with respect to the direction in which the image IM is displayed. The upper and lower surfaces are opposed to each other in the third directional axis DR3, and the normal direction of each of the upper and lower surfaces may be parallel to the third directional axis DR3. Here, directions indicated as the first to third directional axes DR1, DR2, and DR3 may have a relative concept and thus may be changed to other directions. Hereinafter, first to third directions refer to the same reference symbols as the directions indicated by the first to third directional axes DR1, DR2, and DR3, respectively.

In an embodiment, the display device DD may be flexible. The term "flexible" indicates a property of being bendable, and may encompass various structures from a completely foldable structure to a structure bendable to a several-nanometer. In one embodiment, for example, the display device DD may be a curved display device or a foldable display device. Alternatively, the display device DD may be rigid.

In an embodiment, as shown in FIG. 3, the display device DD may include a display panel EP, a polarizing member PM, a window member WM, an optical member OP, a support member SP, and a housing HU. In an embodiment of the display device DD, as illustrated in FIGS. 2 and 3, the window member WM and the housing HU may be coupled to each other to define an exterior of the display device DD.

The window member WM is disposed on the display panel EP to cover a front surface IS of the display panel EP. The window member WM may include a window WP and protective layer PL disposed above the window WP.

The window WP may be a substrate including an optically clear insulating material. The window WP may be a flexible. In one embodiment, for example, the window WP may include a polymer film, a polymer substrate, or a thin glass substrate. The window WP may be a base material having no retardation or a substantially small (or minimal) retardation.

The protective layer PL may be disposed above the window WP to protect the window WP from an external environment. Here, although not illustrated in the drawing, an adhesive layer (not shown) may be additionally disposed between the window WP and the protective layer PL. The adhesive layer (not shown) may be an optically clear adhesive layer. In an embodiment of the display device DD, the protective layer PL may be a layer to be exposed to the outside.

The window member WM may include the upper surface FS exposed to an outside. The upper surface FS of the display device DD may be substantially defined by the upper surface FS of the window member WM. The transmission area TA in the upper surface FS of the window member WM may be an optically clear area. The transmission area TA may have a shape corresponding to the active area AA of the display panel EP. In one embodiment, for example, the transmission area TA overlaps the entire surface or at least a portion of the active area AA. The image IM displayed on the active area AA of the display panel EP may be viewed from the outside through the transmission area TA.

In an embodiment, the bezel area BZA on the upper surface FS of the window member WM may be an area having a relatively lower light transmittance than the transmission area TA. The shape of the transmission area TA may be defined by the bezel area BZA. The bezel area BZA is adjacent to the transmission area TA and may surround the transmission area TA.

In an embodiment, the bezel area BZA may have a predetermined color. In an embodiment, where the window WP includes a glass or polymer substrate, the bezel area BZA may be a color layer which is printed or deposited on one surface of the glass or polymer substrate. Alternatively, the bezel area BZA may be formed by coloring a relevant area of the glass or polymer substrate.

The bezel area BZA may cover a peripheral area NAA of the display panel EP to prevent the peripheral area NAA from being viewed from the outside. However, this is merely exemplary. Alternatively, the bezel area BZA may be omitted in the window member WM.

The hole area HA is may be defined in the transmission area TA of the window member WM. The hole area HA of the window member may be a hole area HA of the display device DD.

The protective layer PL disposed above the window WP may be a layer having a retardation of about 100 nanometers (nm) or less or having a retardation of about 5000 nm or greater. In one embodiment, for example, the retardation of the protective layer PL may be, for example, about 10 nm or less or about 8000 nm or greater. In an embodiment, where the retardation of the protective layer PL is set to about 100 nm or less or about 5000 nm or greater, the optical interference due to the protective layer PL is minimized when an image is captured by using the electronic module EM disposed below the protective layer PL. Thus, high image quality may be obtained.

Herein, the retardation indicates refractive index anisotropy in three axes perpendicular to each other and may be defined as a retardation $R_{th}$ in a thickness direction (or a thickness retardation). The retardation $R_{th}$ may be defined as Equation (1) below.

$$\text{Retardation } R_{th} = \{(|n_x - n_y|/2) - n_z\} \times d \quad (1)$$

In Equation (1), $n_x$ denotes a refractive index in a direction of one axis (x axis) within a surface of a layer or film, $n_y$ denotes a refractive index in a direction of the other axis (y axis) perpendicular to the one axis within the surface of the layer or film, $n_z$ denotes a refractive index in a thickness direction, that is, a z direction, and d denotes the thickness of the layer or film. A retardation value may indicate a value at a specific wavelength, and for example, the retardation value may be a value at about 550 nm wavelength.

In the protective layer PL having the retardation, an elongation rate in a direction of one of the one axis (x axis) and the other axis (y axis) may be different from an elongation rate in a direction of the other. A direction having a relatively high elongation rate may be defined as a first optical axis of the protective layer PL. A first optical axis PL-A (FIG. 8) of the protective layer PL may form an angle of about 45±5° in conjunction with a transmitting axis PP-TA (FIG. 8) of a linear polarizing layer PP which will be described later.

The protective layer PL may include an unstretched cyclo-olefin polymer ("COP") film, an unstretched polyether sulfone ("PES") film, or a stretched polyethylene terephthalate ("PET") film that has a retardation of about 5000 nm or greater. In such an embodiment, the protective layer PL may include an unstretched COP film or an unstretched PES film and have a retardation of about 100 nm or less. Alternatively, the protective layer PL may include a stretched PET film and have a retardation of about 5000 nm or greater, that is, an ultrahigh retardation.

In an embodiment, a thickness of the protective layer PL may be about 40 micrometers (μm) or more. In one embodiment, for example, the protective layer PL may have a thickness of about 80 μm or more and may be a PET film having a retardation of about 5000 nm or more.

In an embodiment, the protective layer PL included in the window member WM may have transmittance of about 90% or greater in a visible light region, a haze value less than about 1%, and a yellow index less than about 1. In such an embodiment, the retardation of the protective layer PL may be about 100 nm or less or about 5000 nm or greater. In an embodiment where the protective layer PL is used in a flexible display device, the protective layer PL is desired to be flexible. The flexibility may be evaluated by examining feasibility when bending tests of bending to the radius of curvature of about 2 millimeters (mm) are performed about 200,000 times or more. In one embodiment, for example, the unstretched PES film may have the features of the protective layer PL described above. The unstretched PES film has transmittance of about 91%, a haze value less than about 0.2% or less, and a yellow index less than about 0.1. In an embodiment, the retardation of the unstretched PES is less than about 10 nm, and favorable properties are exhibited when the bending tests are performed about 200,000 times.

In an embodiment, the display device DD includes the display panel EP disposed below the window member WM. The display panel EP may include the active area AA on which the image IM is displayed and the peripheral area NAA adjacent to the active area AA. In such an embodiment, the front surface IS of the display panel EP may include the active area AA and the peripheral area NAA. The active area AA may be an area to be activated in response to an electrical signal.

The peripheral area NAA may be adjacent to the active area AA. The peripheral area NAA may surround the active area AA. A driving circuit, a driving line, or the like for driving the active area AA may be disposed in the peripheral area NAA.

Various signal lines and pads PD for providing electrical signals to the active area AA, electronic elements, or the like may be disposed in the peripheral area NAA. The peripheral area NAA is covered by the bezel area BZA, and thus may not be viewed from the outside.

In an embodiment, as illustrated in FIGS. 2 and 3, the display panel EP may be assembled while the active area AA and the peripheral area NAA are in a flat state facing the window member WM. However, this is merely exemplary. Alternatively, a portion of the peripheral area NAA in the display panel EP may be bent. Here, the portion of the peripheral area NAA faces a rear surface of the display device DD, and thus, the bezel area BZA on the front surface of the display device DD may be reduced. In an alternative embodiment, the active area AA of the display panel EP may also be assembled in a bent state. In an alternative embodiment, the peripheral area NAA of the display panel EP may be omitted.

A panel hole area HA-EP may be defined in the display panel EP. The panel hole area HA-EP may be positioned within the active area AA. The panel hole area HA-EP may be a portion which is spaced apart from the peripheral area NAA and defined within the active area AA. The image IM may not be displayed on the panel hole area HA-EP. The panel hole area HA-EP may be a portion overlapping the electronic module EM. In an embodiment, the panel hole area HA-EP may be an area corresponding to a through-hole HH which will be described later. In such an embodiment, the through-hole HH may overlap the active area AA and be spaced apart from the peripheral area NAA in a plan view.

The display device DD may include a circuit board DC connected to the display panel EP. The circuit board DC may include a flexible board CF and a main board MB. The flexible board CF may include an insulating film and conductive lines mounted on the insulating film. The conductive lines are connected to the pads PD, and thus, the circuit board DC and the display panel EP are electrically connected to each other.

In an embodiment, the flexible board CF may be assembled in a bent state. Accordingly, the main board MB may be disposed on the rear surface of the display panel EP and thus may be stably accommodated within a space provided by the housing HU. In one embodiment, for example, the main board MB may be bent toward the rear surface of the display panel EP and disposed below the support member SP. In an alternative embodiment, the flexible board CF may be omitted, and in such an embodiment, the main board MB may be directly connected to the display panel EP.

The main board MB may include signal lines and electronic elements which are not shown in the drawing. The electronic elements may be connected to the signal lines and electrically connected to the display panel EP. The electronic elements generate various electrical signals, for example, a signal for producing the image IM or a signal for sensing an external input, or perform processing on the sensed signals. In an embodiment, the main board MB may be provided in plural to respectively correspond to the electrical signals for the generation and processing but is not limited to one embodiment.

The polarizing member PM may be disposed between the display panel EP and the window member WM. The polarizing member PM may include a polarizing plate POL. In an embodiment, the polarizing member PM may further include an adhesive layer AP1 or AP2 disposed on at least one of an upper surface and the lower surface of the polarizing member PM. Each of the adhesive layers AP1 and AP2 may be an optically clear adhesive layer, but the embodiment is not limited thereto. In an embodiment, as shown in FIG. 4, the first adhesive layer AP1 may be disposed between the polarizing plate POL and the window member WM, and the second adhesive layer AP2 may be disposed between the display panel EP and the polarizing plate POL.

Figure 5:
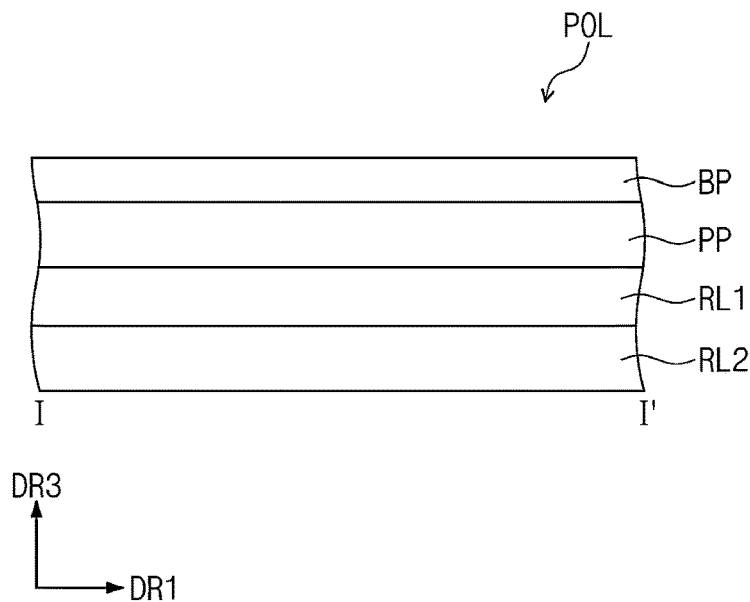
FIG. 5 is a cross-sectional view of a polarizing plate according to an embodiment.
Figure 6:
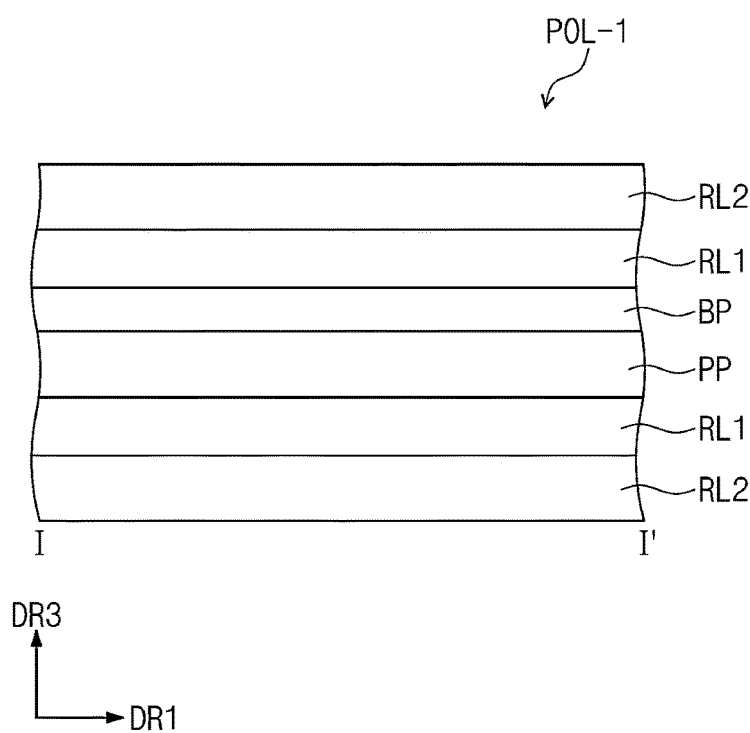
FIG. 6 is a cross-sectional view of a polarizing plate according to an alternative embodiment.

Each of FIGS. 5 and 6 is a cross-sectional view showing a polarizing plate included in a polarizing member according to an embodiment. Each of embodiments of a polarizing plate POL and POL-1 may include a linear polarizing layer PP and at least one retardation layer RL1 and RL2. Here, the embodiment of the polarizing plat POL-1 shown in FIG. 6 is substantially the same as the embodiment of the polarizing plat POL shown in FIG. 5 except that retardation layers RL1 and RL2 above the base film BP are further included.

In an embodiment of the polarizing plate POL or POL-1, the linear polarizing layer PP may be an optical layer for linearly polarizing the provided light in one direction or a first direction. The linear polarizing layer PP may be a film-type linear polarizer including a stretched polymer film. In one embodiment, for example, the stretched polymer film may be a stretched polyvinylalcohol-based film.

The linear polarizing layer PP may be manufactured by adsorbing a dichroic dye onto the stretched polymer film. In one embodiment, for example, the linear polarizing layer PP may be manufactured by adsorbing iodine onto the stretched polymer film. In such an embodiment, a direction in which the polymer film is stretched may be an absorbing axis of the linear polarizing layer PP, and a direction perpendicular to the stretched direction may be a transmitting axis of the linear polarizing layer PP.

Referring to FIG. 5, an embodiment of the polarizing plate POL may include the first retardation layer RL1 and the second retardation layer RL2 which are disposed below the linear polarizing layer PP. The second retardation layer RL2 may be disposed below the first retardation layer RL1.

In an alternative embodiment, as shown in FIG. 6, the polarizing plate POL-1 may further include the retardation layers RL1 and RL2 disposed above the linear polarizing layer PP. In such an embodiment, the polarizing plate POL-1 may include a first retardation layer RL1 and a second retardation layer RL2 sequentially disposed downward from the linear polarizing layer PP and a first retardation layer RL1 and a second retardation layer RL2 sequentially disposed upward from the linear polarizing layer PP.

In an embodiment of the polarizing plate POL or POL-1, the first retardation layer RL1 may be disposed closer to the linear polarizing plate PP than the second retardation layer RL2.

Each of the first retardation layer RL1 and the second retardation layer RL2 may be an optical layer for delaying a phase of the provided light. In an embodiment, the first retardation layer RL1 may be a $\lambda/2$ retardation layer, and the second retardation layer RL2 may be a $\lambda/4$ retardation layer.

The first retardation layer RL1 may be an optical layer that delays, by $\lambda/2$, a phase of the light provided thereto. In one embodiment, for example, when a wavelength of the light, which is provided to the first retardation layer RL1 after passing through the linear polarizing layer PP, is about 550 nm, the light passing through the first retardation layer RL1 may have a phase delay (or retardation) of about 275 nm. In such an embodiment, the first retardation layer RL1 may change a polarization state of the incident light. A polarization direction of the linearly polarized light, which is incident from the linear polarizing layer PP to the first retardation layer RL1, may change.

In an embodiment, the second retardation layer RL2 has optically anisotropic properties and may change a polarization state of light incident onto the second retardation layer RL2. That is, the light, which is provided to the second retardation layer RL2 after passing through the linear polarizing layer PP, may change from a linearly polarized state to a circularly polarized state. In such an embodiment, the light, which is provided to the second retardation layer RL2 in the circularly polarized state, may change into the linearly polarized state. In one embodiment, for example, when a wavelength of the light, which is provided to the second retardation layer RL2 after passing through the linear polarizing layer PP, is about 550 nm, the light that passing through the second retardation layer RL2 may have a phase delay or retardation of about 137.5 nm.

An angle $\theta_{RL1}$ (FIG. 8) between a transmitting axis PP-TA (FIG. 8) of the linear polarizing layer PP and an optical axis RX-1 (also referred to as a second optical axis) (FIG. 8) of the first retardation layer RL1 may be about 15±5°. Also, an angle $\theta_{RL2}$ (FIG. 8) between the transmitting axis PP-TA (FIG. 8) of the linear polarizing layer PP and an optical axis RX-2 (also referred to as a third optical axis) (FIG. 8) of the second retardation layer RL2 may be about 75±5°.

In an embodiment of the polarizing plate POL or POL-1, each of the first retardation layer RL1 and the second retardation layer RL2 may be a liquid crystal coating layer. Each of the first retardation layer RL1 and the second retardation layer RL2 may be a liquid crystal coating layer produced by using a reactive liquid crystal monomer. Each of the first retardation layer RL1 and the second retardation layer RL2 may be manufactured through a polymerization process after coating and aligning of the reactive liquid crystal monomer.

An embodiment of the polarizing plate POL or POL-1 may further include a base film BP which is disposed above the linear polarizing layer PP. In the base film BP, an elongation rate in one direction is greater than an elongation rate in another direction or a second direction.

In an embodiment of the polarizing plate POL or POL-1, an angle between the transmitting axis PP-TA (FIG. 8) of the linear polarizing layer PP and an optical axis of the base film BP (also referred to as a fourth optical axis) may be about 45±5°. The fourth optical axis of the base film BP corresponds to a direction with a higher elongation rate.

The base film BP may be a stretched acrylic film, a stretched COP film, or a stretched PET film. In an embodiment where the base film BP is the stretched COP film, the retardation may be about 130 nm to about 140 nm. In an alternative embodiment, where the base film BP is a stretched PET film, the retardation may be about 8000 nm or greater.

In an embodiment, as described above with reference to FIGS. 1 to 6, the display device DD includes the polarizing plate POL or POL-1 described above illustrated in FIG. 5 or 6. The optical interference due to the polarizing member PM is minimized when an image is captured by using the electronic module EM disposed below the polarizing member PM, and thus, the high image quality may be obtained.

In such an embodiment, the display device DD includes the base film BP, which has the elongation rate in one direction greater than the elongation rate in the other direction (second direction) crossing the one direction (first direction) as in the polarizing plate POL or POL-1 illustrated in FIG. 5 or 6. Thus, a sunglass effect, which may occur in a case where light in a polarization state is provided from an outside of the display device DD, may be solved or effectively prevented.

Referring to FIGS. 3 and 4, an embodiment of the display device DD may include the optical member OP disposed below the display panel EP. The optical member OP may include a polymer film PF having an in-plane retardation of about 600 nm or less or about 5000 nm or greater. The polymer film PF may be an optically clear PET film.

In an embodiment, the optical member OP may further include an adhesive layer AP3 disposed between the display panel EP and the polymer film PF. The adhesive layer AP3 may be an optically clear adhesive layer.

In an embodiment, the polymer film PF may have an extremely low retardation value or have an ultrahigh retardation value. The polymer film PF may be an unstretched PET film in which a difference in refractive indexes in two axial directions perpendicular to each other is small or an unstretched PET film in which an elongation rate in a direction of one axis is significantly greater than an elongation rate in a direction of the other axis perpendicular to the one axis.

In an embodiment, the display device DD may include the support member SP disposed below the optical member OP. The support member SP may include a cushion layer CM and a metal support layer MP. In an embodiment, the support member SP may further include at least one adhesive layer AP4 or AP5.

In an embodiment, the through-hole HH may be defined in the support member SP. The through-hole HH may be defined through the cushion layer CM and the metal support layer MP. In such an embodiment, the through-hole HH may be defined through the adhesive layers AP4 and AP5 included in the support member SP.

The through-hole HH may be defined in the active area AA of the display panel EP. In an embodiment, as shown in FIG. 3, the panel hole area HA-EP may be disposed within the active area AA of the display panel EP. Also, each of a film hole area HA-OP of the optical member OP and a polarization hole area HA-P of the polarizing member PM may also be a portion corresponding to the through-hole HH.

The cushion layer CM may be provided to protect the display panel EP, the electronic module EM, and the like against a physical impact applied from the outside of the display device DD. In an embodiment, the cushion layer CM may have a predetermined thickness or more to define the through-hole HH. A thickness of the cushion layer CM may be about 50 μm or more. In one embodiment, for example, the thickness of the cushion layer CM may be about 100 μm or more.

The cushion layer CM may include at least one selected from an acryl-based polymer, a urethane-based polymer, a silicon-based polymer, and an imide-based polymer. The cushion layer CM may have a predetermined strength or greater to ensure that the display panel EP, the electronic module EM, and the like are protected and the through-hole HH is defined.

A fourth adhesive layer AP4 is further disposed above the cushion layer CM. The fourth adhesive layer AP4 may couple the cushion layer CM to the optical member OP.

The metal support layer MP may be a support substrate for supporting members which are included in the display device DD including the display panel EP. The metal support layer MP may be a thin metal substrate. The metal support layer MP may have a function of dissipating heat, shielding electromagnetic waves, or the like.

In an embodiment, as shown in FIG. 4, the metal support layer MP included in the support member SP may be a single layer, but the embodiment is not limited thereto. Alternatively, the support member SP may include a plurality of stacked metal support layers. In such an embodiment, adhesive layers may be further provided between the plurality of metal support layers.

The electronic module EM is disposed below the display panel EP. The electronic module EM may overlap the through-hole HH. The electronic module EM may receive an external input transmitted through the through-hole HH or provide an output through the through-hole HH. In an embodiment, the electronic module EM may be a camera module.

The window member WM, the polarizing member PM, the display panel EP, and the optical member OP may be disposed above the electronic module EM. In an embodiment of the display device DD according to the invention, relationships between the optical axes and the retardation values of the protective layer PL of the window member WM, the polarizing plate POL, and the polymer film PF of the optical member OP, which are disposed above the electronic module EM, are predetermined to be optimized. Thus, when the electronic module EM is used, the optical interference caused by the window member WM, the polarizing member PM, the display panel EP, and the optical member OP may be minimized. In an embodiment of the display device DD, among the functional layers disposed above and below the display panel EP, the protective layer PL and the polymer film PF are allowed to have a significantly small retardation, or the protective layer PL and the polymer film PF are allowed to have an ultrahigh retardation. Thus, the quality of the image from which a rainbow mura phenomenon caused by the functional layers is alleviated may be exhibited.

In an embodiment, the electronic module EM is disposed overlapping the active area AA, and thus, the bezel area BZA may be effectively reduced. The electronic module EM may be disposed with at least a portion thereof inserted into the through-hole HH defined in the support member SP.

Figure 7:
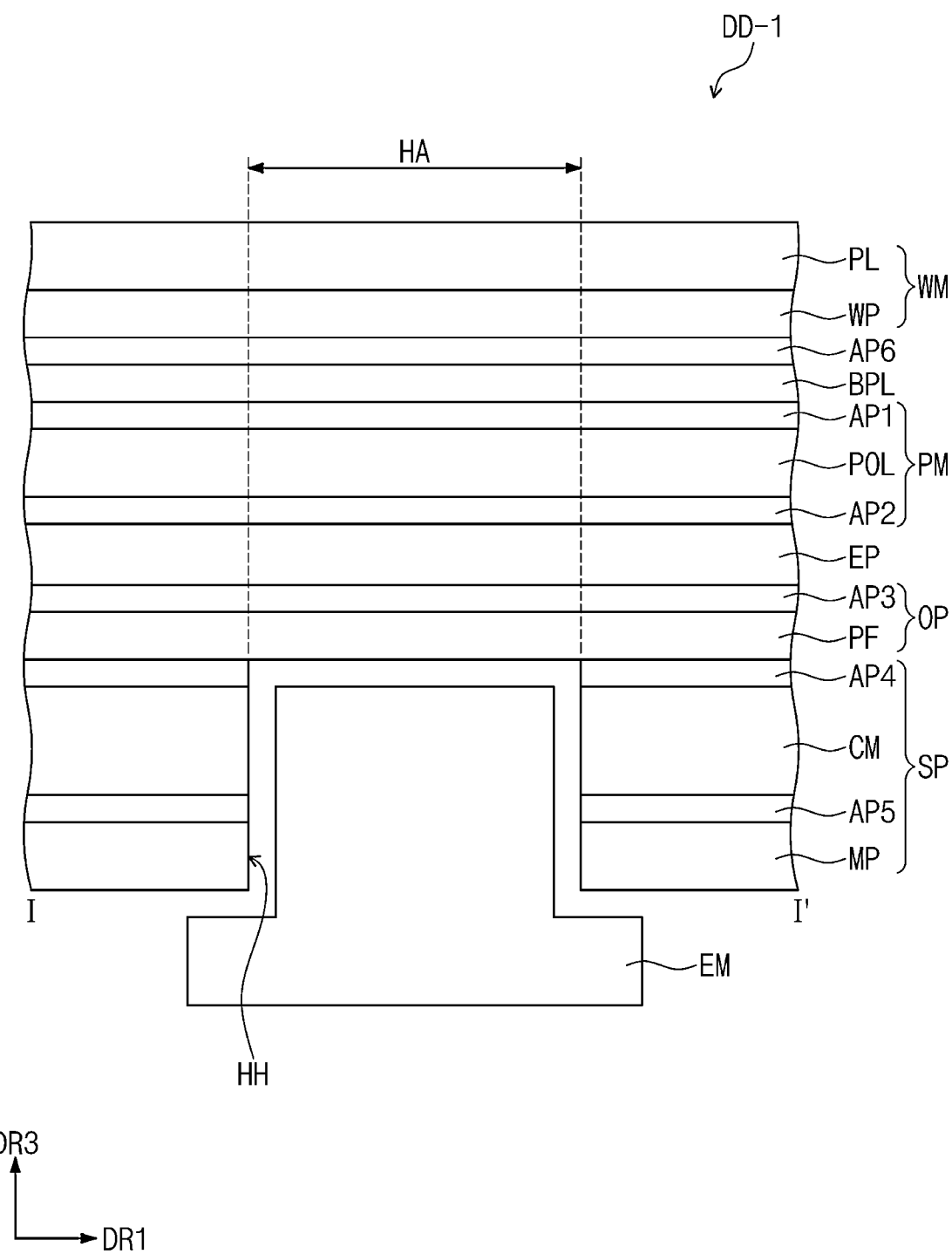
FIG. 7 is a cross-sectional view of a display device according to an alternative embodiment.

FIG. 7 is a view showing a cross-section of a display device according to an alternative embodiment. The embodiment of the display device DD-1 shown in FIG. 7 is substantially the same as the embodiments described above with reference to FIGS. 1 to 6 except for an impact absorbing layer BPL. The same or like elements shown in FIG. 7 have been labeled with the same reference characters as used above to describe the embodiments of the display device DD shown in FIG. 4, and any repetitive detailed description thereof will hereinafter be omitted or simplified.

An embodiment of a display device DD-1 may include the display panel EP, the polarizing member PM and a window member WM which are disposed above the display panel EP, and the optical member OP and the support member SP which are disposed below the display panel EP. In such an embodiment, the display device DD-1 may further include the impact absorbing layer BPL disposed between the polarizing member PM and the window member WM. The impact absorbing layer BPL may be disposed between the polarizing plate POL and the window WP. In an embodiment, the impact absorbing layer BPL may be attached to the window WP via an adhesive layer AP6.

The impact absorbing layer BPL may have a retardation of about 100 nm or less. In one embodiment, for example, the impact absorbing layer BPL may have a retardation of about 10 nm or less. The impact absorbing layer BPL may include an unstretched COP film or an unstretched PES film.

In an embodiment of the display device DD-1, relationships between the optical axes and the retardation values of the protective layer PL of the window member WM, the polarizing plate POL, the polymer film PF of the optical member OP, and the impact absorbing layer BPL, which are disposed above the electronic module EM, are predetermined to be optimized. Thus, when the electronic module EM is used, the optical interference caused by the window member WM, the polarizing member PM, the display panel EP, the optical member OP, and the impact absorbing layer BPL may be minimized. In such an embodiment, among the functional layers disposed above and below the display panel EP in the display device DD-1, the protective layer PL and the polymer film PF are allowed to have a significantly small retardation or to be an ultrahigh retardation, and the impact absorbing layer BPL is allowed to have a significantly small retardation. Thus, the quality of the image from which a rainbow mura phenomenon caused by the functional layers is alleviated may be exhibited.

Figure 8:
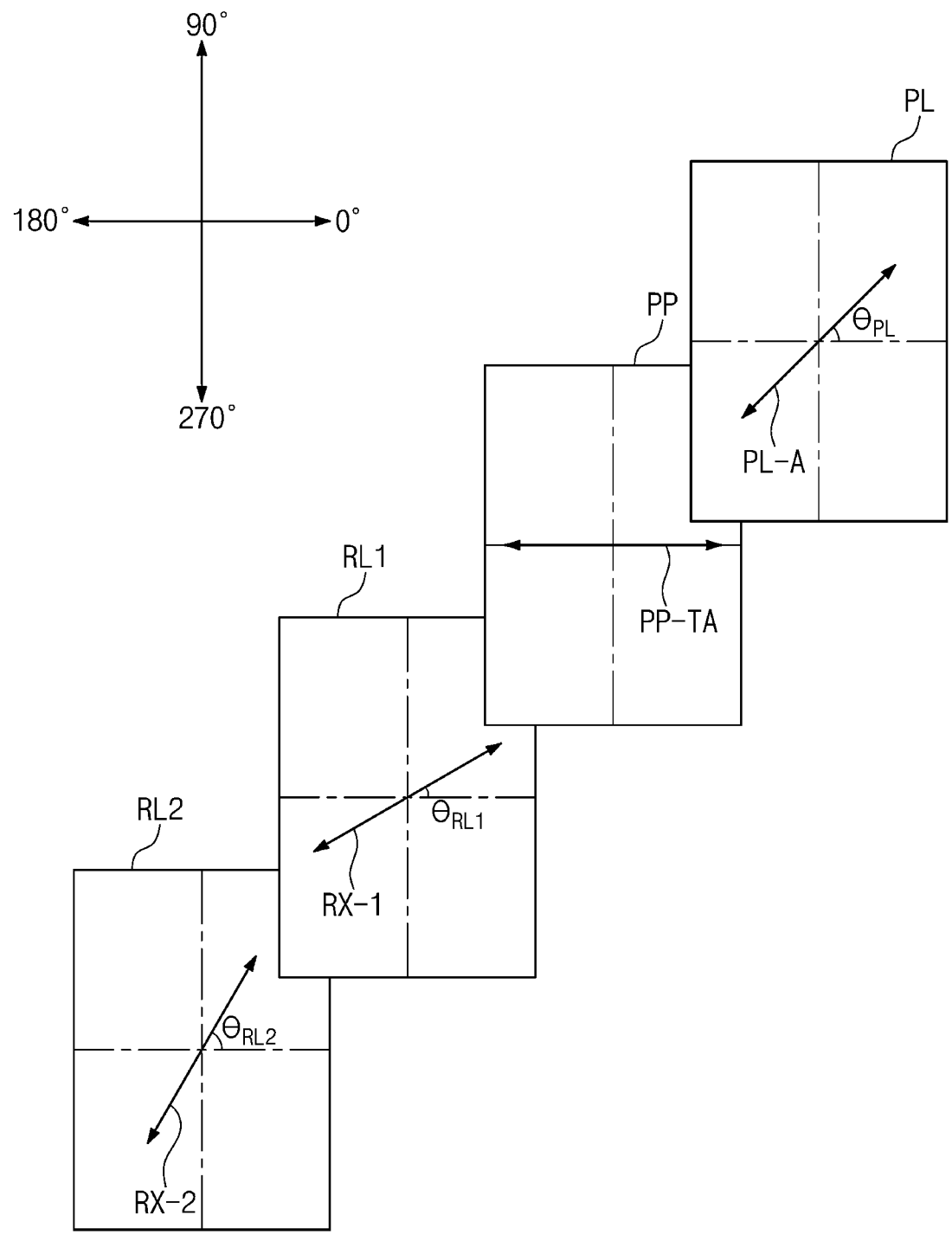
FIG. 8 is a view showing relationships between optical axes in a display device according to an embodiment.

FIG. 8 schematically illustrates relationships between optical axes of functional layers in a display device according to an embodiment. In an case where a direction of the transmitting axis PP-TA of the linear polarizing layer PP is 0° and 180° directions, an angle $\theta_{PL}$ between the first optical axis PL-A of the protective layer PL disposed above the linear polarizing layer PP and the transmitting axis PP-TA of the linear polarizing layer PP may be about 45±5°. In such an embodiment, the angle $\theta_{RL1}$ between the second optical axis RX-1 of the first retardation layer RL1 and the transmitting axis PP-TA of the linear polarizing layer PP may be about 15±5°, and the angle $\theta_{RL2}$ between the third optical axis RX-2 of the second retardation layer RL2 and the transmitting axis PP-TA of the linear polarizing layer PP may be about 75±5°.

Here, the transmitting axis PP-TA of the linear polarizing layer PP, the first optical axis PL-A of the protective layer PL, the second optical axis RX-1 of the first retardation layer RL1, and the third optical axis RX-2 of the second retardation layer RL2, as illustrated in FIG. 8, show relative arrangement of the optical axes. The direction of each of the optical axes is not limited to those of FIG. 8. In one embodiment, for example, when viewed from the upper surface FS of the display device DD (FIG. 2), the transmitting axis PP-TA of the linear polarizing layer PP may be parallel to the first directional axis DR1 or parallel to the second directional axis DR2. That is, the transmitting axis PP-TA of the linear polarizing layer PP may be in a 0° or 90° direction. However, the embodiment is not limited thereto. Alternatively, the transmitting axis PP-TA of the linear polarizing layer PP may be in a 45° direction. In an embodiment where the transmitting axis PP-TA of the linear polarizing layer PP is in the 45° direction, the angle between the transmitting axis PP-TA of the linear polarizing layer PP and each of the optical axes of the protective layer PL, the first retardation layer RL1, and the second retardation layer RL2 may be defined as above.

FIG. 9 is a view schematically showing an embodiment of a display device in an environment of use.

Similar to FIG. 1, FIG. 9 shows a case where a display device DD is used in front of an electronic apparatus ED. FIG. 9 schematically illustrates a case where an upper surface FS, which is a display surface of the display device DD, is used to face a display surface ED-FS of the electronic apparatus ED.

Each of FIGS. 10A and 10B shows relationships of optical axes between a polarizing layer ED-PPa of the electronic apparatus ED and functional layers PP and PL (i.e., the linear polarizing layer PP and the protective layer PL) of the display device DD in a case where the display device DD is used in the environment illustrated in FIG. 9. Also, each of FIGS. 11A and 11B shows a simulation result that reproduces a case where the display device DD is used in front of the electronic apparatus ED as described above with reference to the FIGS. 1 and 9.

In an embodiment, as shown in FIG. 10A, when a direction of the transmitting axis PP-TA of the linear polarizing layer PP is 0° and 180° directions, an angle $\theta_{PL}$ between the first optical axis PL-A of the protective layer PL disposed above the linear polarizing layer PP and the transmitting axis PP-TA of the linear polarizing layer PP may be about 45±5°. Also, a transmitting axis ED-TA of the polarizing layer ED-PPa of the electronic apparatus ED disposed adjacent to the display surface ED-FS of the electronic apparatus ED (FIG. 9) may be perpendicular to the transmitting axis PP-TA of the linear polarizing layer PP in 90° and 270° directions.

In FIG. 10B, compared to FIG. 10A, a transmitting axis ED-TA of a polarizing layer ED-PPb of the electronic apparatus ED may be in 0° and 180° directions and parallel to the transmitting axis PP-TA of the linear polarizing layer PP.

Each of FIGS. 11A and 11B shows a spectrum of transmission light according to a wavelength in a case having the relationship of optical axes as illustrated in FIG. 10A. Here, the spectrum of light transmittance according to the wavelength illustrated in FIGS. 11A and 11B may be calculated from Equation (2) below.

$$I(\lambda) = I_0 \sin^2 2\theta \sin^2 \frac{\pi \text{Re}}{\lambda} \tag{1}$$

In Equation (2), $I_0$ denotes intensity of incident light, $I(\lambda)$ denotes the intensity of emitted light, $\theta$ denotes an angle between the first optical axis PL-A of the protective layer PL and the transmitting axis PP-TA of the linear polarizing layer PP, $\lambda$ denotes a wavelength, and Re denotes a retardation of the protective layer PL.

FIG. 11A shows the light transmittance according to the wavelength in a case where: the angle $\theta_{PL}$ between the first optical axis PL-A of the protective layer PL and the transmitting axis PP-TA of the linear polarizing layer PP is about 45°; and the retardation of the protective layer PL is about 8000 nm. When the result of a spectrum TP-a of the emitted light is examined in FIG. 11A, it may be found that the transmittance of the emitted light appears uniform over the entire R, G, and B wavelength regions. That is, in an embodiment of the display device, the window member includes the protective layer having the ultrahigh retardation of about 5000 nm or greater, and thus, the transmission spectrum is uniformly distributed in a wavelength band of a visible light region. Therefore, color shift, rainbow mura, and the like, which are likely to occur when an image is captured in a selfie mode by using the display device in front of the electronic apparatus including the polarizing layer, may be solved or effectively prevented.

FIG. 11B shows the light transmittance according to the wavelength in a case where: the angle $\theta_{PL}$ between the first optical axis PL-A of the protective layer PL and the transmitting axis PP-TA of the linear polarizing layer PP is about 45°; the transmitting axis PP-TA of the linear polarizing layer PP is perpendicular to the transmitting axis ED-TA of the polarizing layer ED-PPa of the electronic apparatus ED; and the retardation of the protective layer PL is about 10 nm. When the result of a spectrum TP-b of the emitted light is examined in FIG. 11B, it may be found that the transmittance of the emitted light shows a value approximately close to zero over the entire R, G, and B wavelength regions. That is, in an embodiment of the display device, the window member includes the protective layer having a low retardation of about 100 nm or less, and thus, low transmission light spectrum is exhibited over the entire visible light wavelength band. Therefore, color shift, rainbow mura, and the like, which occurs when an image is captured in a selfie mode by using the display device in front of the electronic apparatus including the polarizing layer, may be solved or effectively prevented. However, in such an embodiment, an amount of the transmitted light is approximately close to zero, and a sunglass effect may occur.

In an embodiment, when the retardation of the protective layer PL has a significantly high value of about 5000 nm or greater as well as when the retardation has a significantly low value of about 100 nm or less, the transmitting axis ED-TA of the polarizing layer ED-PPb of the electronic apparatus ED is parallel to the transmitting axis PP-TA of the linear polarizing layer PP as in FIG. 10B, such that the image may be obtained with a alleviated rainbow mura. In an embodiment, the transmitting axis ED-TA of the polarizing layer ED-PPb of the electronic apparatus ED is parallel to the transmitting axis PP-TA of the linear polarizing layer PP, such that sunglass effect illustrated in FIG. 11B may be effectively prevented. Thus, the display quality may be improved even when an image is captured in front of the electronic apparatus by using the display device of the embodiment.

In an embodiment of the display device, the window member and the optical member, which are disposed above the electronic module, respectively include the protective layer and the polymer film which have the low retardation value or have an ultrahigh retardation value, and thus, the optical interference phenomenon caused by the window member and the optical member may be minimized. In an embodiment of the display device, the relationships between the optical axes and the retardation values of the optical functional layers included in the window member, the polarizing member, and the optical member, which are disposed above the electronic module, are predetermined to be optimized. Thus, the image quality may be improved when the image is captured in the selfie mode.

Embodiments of the invention provide the display device in which the quality of the image captured by the camera module is improved by optimizing the arrangement of the optical axes of the polarizing plate and the protective layer, which are disposed above the display panel, and the retardation value of the protective layer.

In an embodiment of the display device, the retardation values of the functional layers disposed above and below the display panel are optimized, and thus, the image quality of an image obtained by using the camera module disposed in the active area is improved even when a selfie is taken in front of the electronic apparatus.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:
    a display panel;
    a polarizing plate disposed above the display panel, wherein the polarizing plate comprises a linear polarizing layer and a retardation layer;
    a window member disposed above the polarizing plate, wherein the window member comprises a window and a protective layer disposed above the window, and the protective layer has a retardation of about 100 nm or less or about 5000 nm or greater;
    an optical member disposed below the display panel;
    a support member disposed below the optical member, wherein a through-hole is defined through the support member; and
    an electronic module disposed to correspond to the through-hole,
    wherein each of a film hole area of the optical member and a polarization hole area of the polarizing plate is a portion corresponding to the through-hole, and
    wherein the film hole area, which is one portion of the optical member integrally formed with a remaining portion of the optical member as a single unitary and indivisible part, covers the electronic module corresponding to the through-hole.

2. The display device of claim 1, wherein
    the protective layer comprises an unstretched cyclo-olefin polymer film, an unstretched polyether sulfone film, or a stretched polyethylene terephthalate film which has a retardation of about 5000 nm or more.

3. The display device of claim 1, wherein an angle between a transmitting axis of the linear polarizing layer and an optical axis of the protective layer is about 45±5°.

4. The display device of claim 1, wherein
    the polarizing plate further comprises a base film disposed above the linear polarizing layer,
    wherein the base film has an elongation rate in a first direction which is greater than an elongation rate in a second direction perpendicular to the first direction, and
    the retardation layer is disposed below the linear polarizing layer or above the base film.

5. The display device of claim 4, wherein
    the retardation layer comprises a λ/2 retardation layer and a λ/4 retardation layer, and
    the λ/2 retardation layer is disposed closer to the linear polarizing layer than the λ/4 retardation layer is.

6. The display device of claim 5, wherein
    an angle between a transmitting axis of the linear polarizing layer and an optical axis of the λ/2 retardation layer is about 15±5°, and
    an angle between the transmitting axis of the linear polarizing layer and an optical axis of the λ/4 retardation layer is about 75±5°.

7. The display device of claim 5, wherein each of the λ/2 retardation layer and the λ/4 retardation layer is a liquid crystal coating layer.

8. The display device of claim 4, wherein the base film is a stretched acrylic film, a stretched cyclo-olefin polymer film, or a stretched polyethylene terephthalate film.

9. The display device of claim 4, wherein an angle between a transmitting axis of the linear polarizing layer and an optical axis of the base film is about 45±5°.

10. The display device of claim 1, wherein the optical member comprises a polymer film having a retardation of about 600 nm or less or about 5000 nm or more.

11. The display device of claim 10, wherein the polymer film is a polyethylene terephthalate film.

12. The display device of claim 1, further comprising:
    an impact absorbing layer disposed between the polarizing plate and the window member.

13. The display device of claim 12, wherein the impact absorbing layer has a retardation of about 100 nm or less.

14. The display device of claim 12, wherein the impact absorbing layer comprises an unstretched cyclo-olefin polymer film or an unstretched polyether sulfone film.

15. The display device of claim 1, further comprising:
    an adhesive layer disposed between the window member and the polarizing plate, between the polarizing plate and the display panel, or between the display panel and the optical member.

16. The display device of claim 1, wherein at least a portion of the electronic module is inserted into the through-hole.

17. A display device comprising:
    a display panel;
    a polarizing member disposed above the display panel, wherein the polarizing member comprises a linear polarizing layer;
    a window member disposed above the polarizing member, wherein the window member comprises a protective layer having a first optical axis and a retardation of about 100 nm or less or about 5000 nm or greater, and an angle between the first optical axis and a transmitting axis of the linear polarizing layer is about 45±5°;
    an optical member disposed below the display panel, wherein the optical member comprises a polymer film having a retardation of about 600 nm or less or about 5000 nm or greater;
    a support member disposed below the optical member, wherein a through-hole is defined through the support member; and
    an electronic module disposed to correspond to the through-hole,
    wherein each of a film hole area of the optical member and a polarization hole area of the polarizing member is a portion corresponding to the through-hole, and
    wherein the film hole area, which is one portion of the optical member integrally formed with a remaining portion of the optical member as a single unitary and indivisible part, covers the electronic module corresponding to the through-hole.

18. The display device of claim 17, further comprising:
    an impact absorbing layer disposed between the polarizing member and the window member,
    wherein the impact absorbing layer has a retardation of about 100 nm or less.

19. The display device of claim 17, wherein
    the protective layer comprises an unstretched cyclo-olefin polymer film, an unstretched polyether sulfone film, or a stretched polyethylene terephthalate film which has a retardation of about 5000 nm or greater.

20. The display device of claim 17, wherein
    the display panel comprises an active area and a peripheral area adjacent to the active area, and
    the through-hole overlaps the active area and is spaced apart from the peripheral area in a plan view.

* * * * *